(12) United States Patent
Matsui

(10) Patent No.: US 11,867,246 B2
(45) Date of Patent: Jan. 9, 2024

(54) WEAR VOLUME ESTIMATION DEVICE, WEAR VOLUME ESTIMATION METHOD, AND WEAR VOLUME ESTIMATION PROGRAM

(71) Applicant: Toyota Jidosha Kabushiki Kaisha, Toyota (JP)

(72) Inventor: Noriyoshi Matsui, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 329 days.

(21) Appl. No.: 17/335,524

(22) Filed: Jun. 1, 2021

(65) Prior Publication Data

US 2022/0034379 A1 Feb. 3, 2022

(30) Foreign Application Priority Data

Jul. 29, 2020 (JP) ................................ 2020-128562

(51) Int. Cl.
 *F16D 66/00* (2006.01)
 *F16D 66/02* (2006.01)
 (Continued)

(52) U.S. Cl.
 CPC .......... *F16D 66/021* (2013.01); *B60T 17/221* (2013.01); *F16D 65/092* (2013.01);
 (Continued)

(58) Field of Classification Search
 CPC ...... F16D 66/021; F16D 65/092; F16D 66/00; F16D 2066/001; F16D 2066/006;
 (Continued)

(56) References Cited

U.S. PATENT DOCUMENTS 4,790,606 A * 12/1988 Reinecke ................ B60T 17/22
 73/862.12
5,651,431 A * 7/1997 Kyrtsos ................ F16D 66/026
 303/20

(Continued)

FOREIGN PATENT DOCUMENTS

CN 101349313 A 1/2009
JP 2015-121251 A 7/2015
(Continued)

*Primary Examiner* — Yonel Beaulieu
(74) *Attorney, Agent, or Firm* — Dinsmore & Shohl LLP

(57) ABSTRACT

A wear volume estimation device estimates a wear volume of a brake pad of a vehicle. A wear volume function expresses the wear volume as a function of a vehicle speed, a brake pressure, and a brake duration. The wear volume estimation device calculates the wear volume by using the wear volume function. Moreover, the wear volume estimation device estimates a temperature of a contact surface of the brake pad that comes in contact with a brake rotor, and updates temperature history information indicating at least a temperature history of the contact surface based on the temperature of the contact surface. The wear volume estimation device variably sets the wear volume function according to the temperature history of the contact surface indicated by the temperature history information acquired at a time of previous braking.

7 Claims, 10 Drawing Sheets

(51) Int. Cl.
*F16D 65/00* (2006.01)
*F16D 65/02* (2006.01)
*F16D 69/00* (2006.01)
*B60T 8/00* (2006.01)
*B60T 17/00* (2006.01)
*B60T 8/88* (2006.01)
*F16D 65/092* (2006.01)
*B60T 17/22* (2006.01)

(52) U.S. Cl.
CPC .......... *F16D 66/00* (2013.01); *B60T 2250/04* (2013.01); *B60T 2270/88* (2013.01); *F16D 2066/001* (2013.01); *F16D 2066/006* (2013.01)

(58) Field of Classification Search
CPC ............. F16D 2066/005; F16D 66/026; B60T 17/221; B60T 2250/04; B60T 2270/88; B60T 17/22
See application file for complete search history.

(56) References Cited

U.S. PATENT DOCUMENTS

| | | | |
|---|---|---|---|
| 2008/0236269 A1 | 10/2008 | Howell et al. | |
| 2018/0208300 A1* | 7/2018 | Bill | B64F 5/60 |
| 2022/0018413 A1* | 1/2022 | Matsui | F16D 66/026 |
| 2023/0226859 A1* | 7/2023 | Bill | B60C 23/0479 |
| | | | 73/146.2 |

FOREIGN PATENT DOCUMENTS

| | | | | |
|---|---|---|---|---|
| JP | 6207075 B2 | 10/2017 | | |
| WO | WO-2018099864 A1 * | 6/2018 | ............. | B60T 17/22 |

\* cited by examiner

<FIRST EXAMPLE OF WEAR VOLUME FUNCTION INFORMATION>

| TEMPERATURE HISTORY | WEAR VOLUME FUNCTION |
|---|---|
| LESS THAN 100°C | f0 |
| HAVING HISTORY OF 100°C | f1 |
| HAVING HISTORY OF 200°C | f2 |
| HAVING HISTORY OF 300°C | f3 |

FIG. 8

<SECOND EXAMPLE OF WEAR VOLUME FUNCTION INFORMATION>

| TEMPERATURE HISTORY (HIGHEST VALUE Tmax) | WEAR VOLUME FUNCTION |
|---|---|
| LESS THAN 100°C | f0 |
| 100~200°C | f1 |
| 200~300°C | f2 |
| 300~400°C | f3 |

FIG. 9

WEAR VOLUME ESTIMATION DEVICE, WEAR VOLUME ESTIMATION METHOD, AND WEAR VOLUME ESTIMATION PROGRAM

CROSS-REFERENCE TO RELATED APPLICATION

The present disclosure claims priority under 35 U.S.C. § 119 to Japanese Patent Application No. 2020-128562, filed Jul. 29, 2020, the contents of which application are incorporated herein by reference in their entirety.

BACKGROUND

Technical Field

The present disclosure relates to a technique of estimating a wear volume of a brake pad of a vehicle.

Background Art

Japanese Patent No. 6207075 a wear volume computation device that calculates a wear volume of a braking member of a railroad car and the like. The wear volume computation device calculates (estimates) the wear volume of the braking member based on a brake pressure, a speed of a braking target, and a braking time.

SUMMARY

During braking of a vehicle, a braking force is generated by pressing a brake pad against a brake rotor rotating with a wheel. At this time, the brake pad is worn by friction between the brake pad and the brake rotor. A wear volume of the brake pad per unit input (i.e., per single braking) basically depends on a vehicle speed, a brake pressure, and a brake duration.

The inventor of this application pays attention to a change in physical property of the brake pad due to heat. During braking of the vehicle, frictional heat is generated due to the friction between the brake pad and the brake rotor. Due to the frictional heat, the physical property of a material of the brake pad irreversibly changes, and thus wear characteristics of the brake pad change. Such the change in wear characteristics of the brake pad due to heat is not considered in Japanese Patent No. 6207075. In the case where the change in wear characteristics of the brake pad due to heat is not considered, an estimation accuracy of the wear volume is decreased.

An object of the present disclosure is to provide a technique that can increase an estimation accuracy of a wear volume of a brake pad of a vehicle.

A first aspect is directed to a wear volume estimation device that estimates a wear volume of a brake pad of a vehicle.

The wear volume estimation device includes:
a processor; and
a storage configured to store information on a wear volume function that expresses the wear volume as a function of a vehicle speed, a brake pressure, and a brake duration.

The processor is programmed to execute:
an information acquisition process acquiring information on the vehicle speed, the brake pressure, and the brake duration, during braking of the vehicle;
a wear volume calculation process calculating the wear volume according to the vehicle speed, the brake pressure, and the brake duration by using the wear volume function;
a temperature estimation process estimating a temperature of a contact surface of the brake pad that comes in contact with a brake rotor, based on the vehicle speed, the brake pressure, and the brake duration; and
a temperature history management process updating temperature history information indicating at least a temperature history of the contact surface, based on the temperature of the contact surface.

In the wear volume calculation process, the processor variably sets the wear volume function according to the temperature history of the contact surface indicated by the temperature history information acquired at a time of previous braking.

A second aspect is directed to a wear volume estimation method that estimates a wear volume of a brake pad of a vehicle.

A wear volume function expresses the wear volume as a function of a vehicle speed, a brake pressure, and a brake duration.

The wear volume estimation method includes:
an information acquisition process acquiring information on the vehicle speed, the brake pressure, and the brake duration, during braking of the vehicle;
a wear volume calculation process calculating the wear volume according to the vehicle speed, the brake pressure, and the brake duration by using the wear volume function;
a temperature estimation process estimating a temperature of a contact surface of the brake pad that comes in contact with a brake rotor, based on the vehicle speed, the brake pressure, and the brake duration; and
a temperature history management process updating temperature history information indicating at least a temperature history of the contact surface, based on the temperature of the contact surface.

The wear volume calculation process includes a process of variably setting the wear volume function according to the temperature history of the contact surface indicated by the temperature history information acquired at a time of previous braking.

A third aspect is directed to a wear volume estimation program that estimates a wear volume of a brake pad of a vehicle.

A wear volume function expresses the wear volume as a function of a vehicle speed, a brake pressure, and a brake duration.

The wear volume estimation program, when executed by a computer, causes the computer to execute:
an information acquisition process acquiring information on the vehicle speed, the brake pressure, and the brake duration, during braking of the vehicle;
a wear volume calculation process calculating the wear volume according to the vehicle speed, the brake pressure, and the brake duration by using the wear volume function;
a temperature estimation process estimating a temperature of a contact surface of the brake pad that comes in contact with a brake rotor, based on the vehicle speed, the brake pressure, and the brake duration; and
a temperature history management process updating temperature history information indicating at least a temperature history of the contact surface, based on the temperature of the contact surface.

The wear volume calculation process includes a process of variably setting the wear volume function according to the temperature history of the contact surface indicated by the temperature history information acquired at a time of previous braking.

According to the present disclosure, the temperature of the contact surface of the brake pad that comes in contact with the brake rotor is estimated during the braking of the vehicle. Then, the temperature history information indicating the temperature history of the contact surface is updated based on the temperature of the contact surface. When calculating the wear volume of the brake pad, the temperature history of the contact surface indicated by the temperature history information is taken into consideration. More specifically, the wear volume function used for calculating the wear volume of the brake pad is not fixed but variably set according to the temperature history of the contact surface. As a result, the estimation accuracy of the wear volume is improved.

BRIEF DESCRIPTION OF DRAWINGS

FIG. 8 is a conceptual diagram for explaining a first example of wear volume function information according to an embodiment of the present disclosure;

FIG. 9 is a conceptual diagram for explaining a second example of wear volume function information according to an embodiment of the present disclosure.

EMBODIMENTS

Embodiments of the present disclosure will be described below with reference to the attached drawings.

1. Outline

1-1. Vehicle and Braking Device

Figure 1:
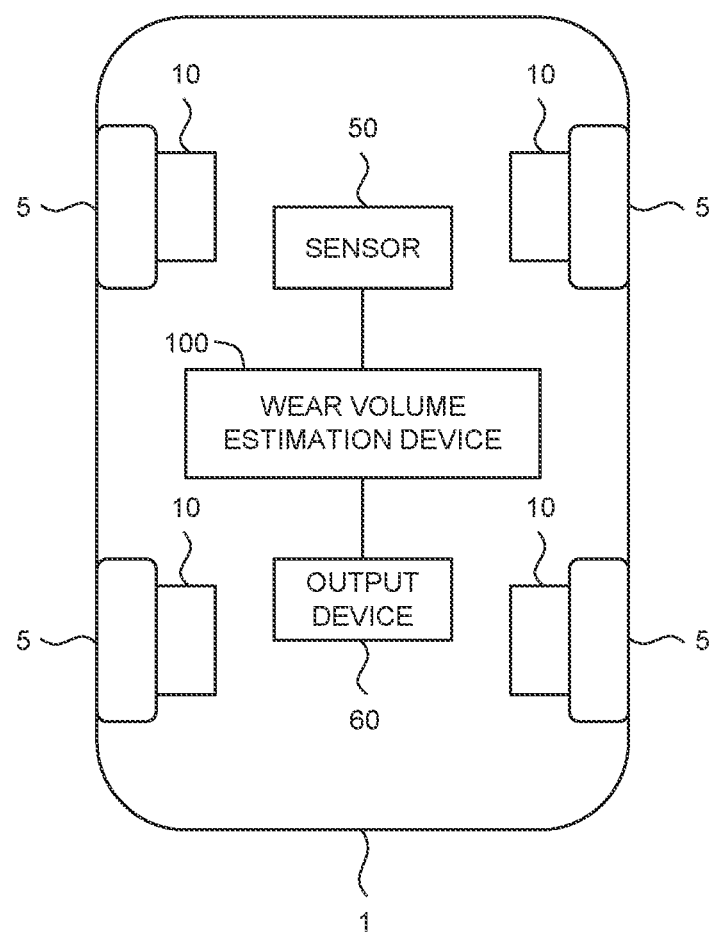
FIG. 1 is a schematic diagram showing a configuration of a vehicle according to an embodiment of the present disclosure.

FIG. 1 is a schematic diagram showing a configuration of a vehicle 1 according to the present embodiment. The vehicle 1 may be an automated driving vehicle controlled by an automated driving system. The vehicle 1 includes a wheel (tire) 5 and a braking device 10. The braking device 10 generates a braking force in response to a brake operation by a driver or the automated driving system.

Figure 2:
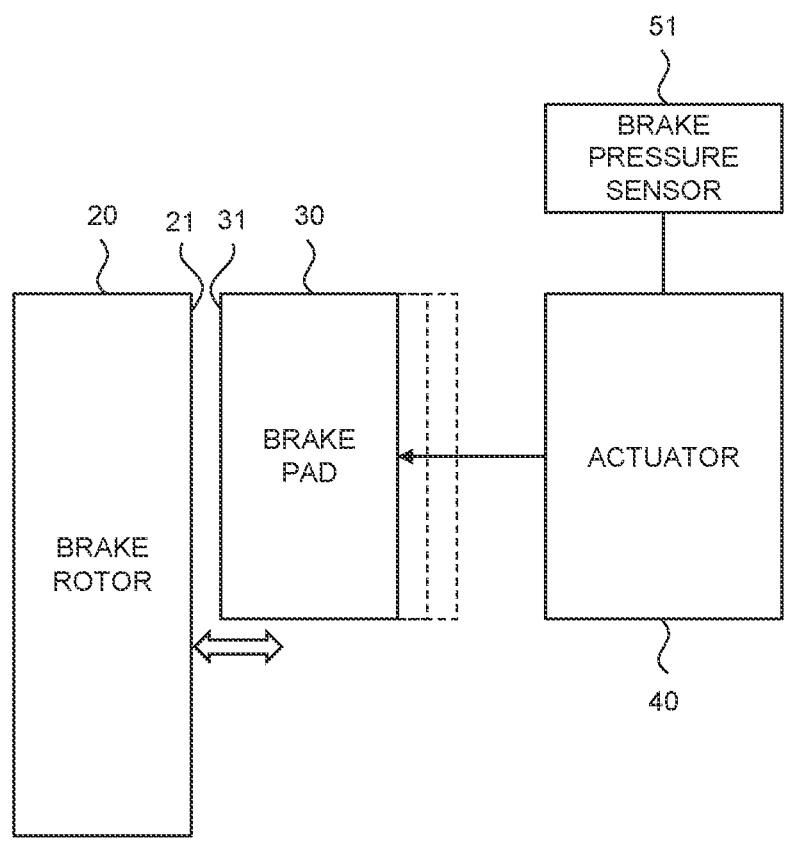
FIG. 2 is a block diagram schematically showing a configuration of a braking device according to an embodiment of the present disclosure.

FIG. 2 is a block diagram schematically showing a configuration of the braking device 10 according to the present embodiment. The braking device 10 includes a brake rotor 20, a brake pad 30, and an actuator 40.

The brake rotor 20 is a rotatable member that rotates with the wheel 5. For example, a material of the brake rotor 20 is cast iron. The brake pad 30 is a friction material that comes in contact with the brake rotor 20. For example, the brake pad 30 is formed by baking and solidifying a composite material including various organic fibers and inorganic fibers with a resin.

The actuator 40 moves and presses the brake pad 30 against the brake rotor 20 in response to the brake operation by the driver or the automated driving system. More specifically, the actuator 40 generates a brake pressure Pb in response to the brake operation and presses the brake pad 30 against the brake rotor 20 by the brake pressure Pb. For example, the actuator 40 includes a master cylinder and a caliper. In response to the brake operation, the master cylinder pushes brake fluid out to the caliper to generate the brake pressure (brake fluid pressure) Pb. The brake pressure Pb causes a piston in the caliper to push the brake pad 30 and push it against the brake rotor 20. As a result, the braking force is generated.

A brake pressure sensor 51 detects the brake pressure (brake fluid pressure) Pb.

During braking of the vehicle 1, the braking force is generated by pressing the brake pad 30 against the brake rotor 20 rotating with the wheel 5. At this time, a surface of the brake rotor 20 and a surface of the brake pad 30 come in contact with each other. The surface of the brake rotor 20 that comes in contact with the brake pad 30 is hereinafter referred to as a "contact surface 21." Similarly, the surface of the brake pad 30 that comes in contact with the brake rotor 20 is hereinafter referred to as a "contact surface 31." Due to friction between the contact surface 21 and the contact surface 31, the contact surface 31 of the brake pad 30 is worn. Hereinafter, a method of estimating a wear volume of the brake pad 30 will be described.

1-2. Wear Volume Estimation

A wear volume W of the brake pad 30 per unit of input (i.e., per single braking) depends on a vehicle speed V, the brake pressure Pb, and a brake duration tb. The vehicle speed V is a rotational speed of the wheel 5 (i.e., a wheel speed). The brake duration tb is a duration in which the brake pressure Pb (i.e., the braking force) is generated. The wear volume W increases as the vehicle speed V becomes higher. The wear volume W increases as the brake pressure Pb becomes higher. The wear volume W increases as the brake duration tb becomes longer. That is, the wear volume W is expressed by the following Equation (1).

$$W = f(V, Pb, tb) \qquad \text{Equation (1):}$$

A wear volume function f expresses the wear volume W as a function of the vehicle speed V, the brake pressure Pb, and the brake duration tb. The wear volume function f is a formula or a map designed in advance. The wear volume function f is designed so that the wear volume W increases as the vehicle speed V becomes higher. Similarly, the wear volume function f is designed so that the wear volume W increases as the brake pressure Pb becomes higher. In addition, the wear volume function f is designed so that the wear volume W increases as the brake duration tb becomes longer.

A wear volume estimation device 100 shown in FIG. 1 estimates the wear volume W based on the wear volume function f. More specifically, during the braking of the vehicle 1, the wear volume estimation device 100 receives information detected by a sensor 50 installed on the vehicle 1. The sensor 50 includes the brake pressure sensor 51 that detects the brake pressure Pb and a wheel speed sensor that detects the vehicle speed V. The wear volume estimation device 100 receives the information on the brake pressure Pb and the vehicle speed V from the sensor 50. The brake duration tb can be acquired from a time during which the brake pressure Pb is generated. The wear volume estimation device 100 calculates the wear volume W according to the vehicle speed V, the brake pressure Pb, and the brake duration tb by using the wear volume function f The wear volume estimation device 100 calculates (estimates) the wear volume W for each brake operation. The wear volume estimation device 100 may calculate a cumulative wear volume Wt by integrating the wear volume W calculated for each brake operation. If the cumulative wear volume Wt exceeds a threshold, the wear volume estimation device 100 may output an alert through an output device 60 (e.g., a display, a speaker).

Typically, the wear volume estimation device 100 is installed on the vehicle 1. Alternatively, the wear volume estimation device 100 may be placed outside the vehicle 1 and remotely estimate the wear volume W. In this case, the wear volume estimation device 100 communicates with the vehicle 1 to acquire the information detected by the sensor 50 installed on the vehicle 1.

1-3. Wear Volume Estimation Considering Temperature History

Figure 3:
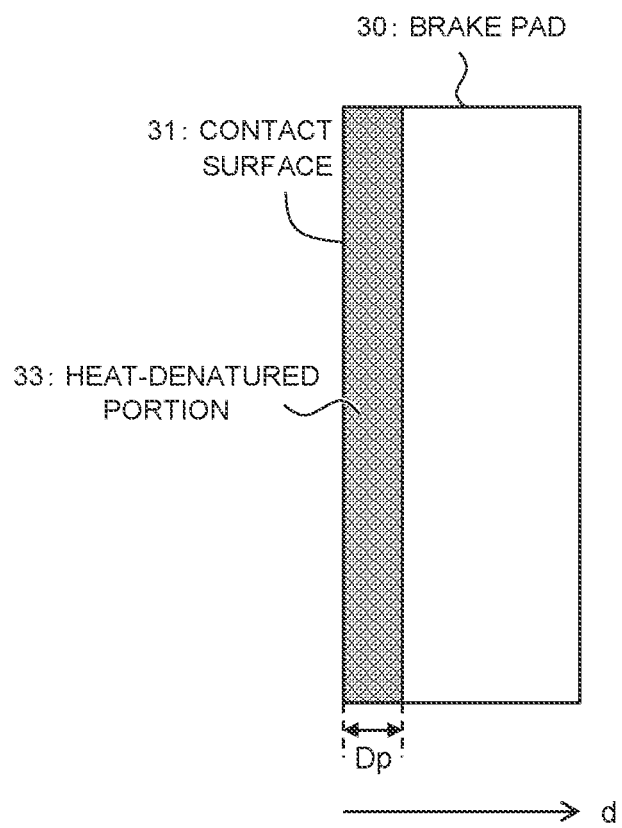
FIG. 3 is a conceptual diagram for explaining heat denaturation of a brake pad.

FIG. 3 is a conceptual diagram for explaining heat denaturation of the brake pad 30. During the braking of the vehicle 1, frictional heat is generated due to the friction between the brake rotor 20 and the brake pad 30. Due to the frictional heat, the physical property of the material of the brake pad 30 irreversibly changes. A heat-denatured portion 33 is a portion of the brake pad 30 whose physical property is changed due to the frictional heat. The heat-denatured portion 33 is generated in a depth direction d from the contact surface 31 coming in contact with the brake rotor 20. A depth of the heat-denatured portion 33 from the contact surface 31 is hereinafter referred to as a "penetration depth Dp."

Wear characteristics of the heat-denatured portion 33 are different from wear characteristics before the heat denaturation. For example, when the brake pad 30 includes a resin, the resin decomposes, melts, and vaporizes at a high temperature condition. As a result, the heat-denatured portion 33 becomes brittle and easy to shave. That is, the heat-denatured portion 33 is more easily worn as compared with the case before the heat denaturation. If such the change in wear characteristics due to head is not considered, an estimation accuracy of the wear volume W is decreased.

In view of the above, according to the present embodiment, the wear volume estimation device 100 estimates the wear volume W in consideration of a temperature history of the brake pad 30 (the contact surface 31) as well. More specifically, during the braking of the vehicle 1, the wear volume estimation device 100 estimates a temperature of the contact surface 31 of the brake pad 30 and updates the temperature history of the contact surface 31 based on the estimated temperature. At a time of next braking, the wear volume estimation device 100 calculates the wear volume W by variably setting the wear volume function f according to the temperature history of the contact surface 31. In other words, the wear volume estimation device 100 calculates the wear volume W by using the wear volume function f that is set according to the temperature history of the contact surface 31.

Figure 4:
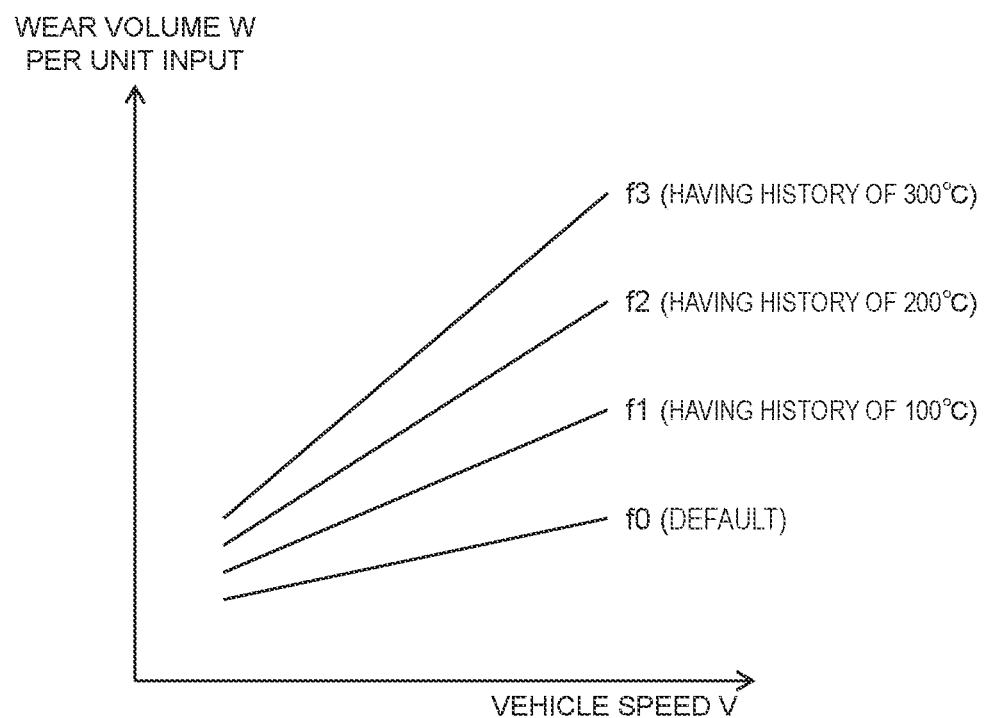
FIG. 4 is a conceptual diagram for explaining an example of variable setting of a wear volume function according to an embodiment of the present disclosure.

FIG. 4 is a conceptual diagram for explaining an example of the variable setting of the wear volume function f according to the present embodiment. A horizontal axis represents the vehicle speed V being one of input parameters input to the wear volume function f, and a vertical axis represents the wear volume W. A wear volume function f0 is a default wear volume function f. A wear volume function f1 is the wear volume function f that is used in a case where the temperature of the contact surface 31 has a history of becoming equal to or higher than 100° C. A wear volume function f2 is the wear volume function f that is used in a case where the temperature of the contact surface 31 has a history of becoming equal to or higher than 200° C. A wear volume function f3 is the wear volume function f that is used in a case where the temperature of the contact surface 31 has a history of becoming equal to or higher than 300° C.

As shown in FIG. 4, the wear volume functions f0 to f3 are designed such that the wear volume W increases as the temperature applied to the contact surface 31 in the past becomes higher. That is, the change in wear characteristics depending on the temperature history of the contact surface 31 is reflected in the wear volume functions f0 to f3. The wear volume estimation device 100 selects a wear volume function f according to the temperature history of the contact surface 31. Then, the wear volume estimation device 100 uses the selected wear volume function f to calculate the wear volume W according to the vehicle speed V, the brake pressure Pb, and the brake duration tb.

According to the present embodiment, as described above, the wear volume function f used for calculating the wear volume W is not fixed but variably set according to the temperature history of the contact surface 31 of the brake pad 30. As a result, the estimation accuracy of the wear volume W is improved.

Hereinafter, the wear volume estimation device 100 according to the present embodiment will be described in more detail.

2. Wear Volume Estimation Device

2-1. Configuration Example

Figure 5:
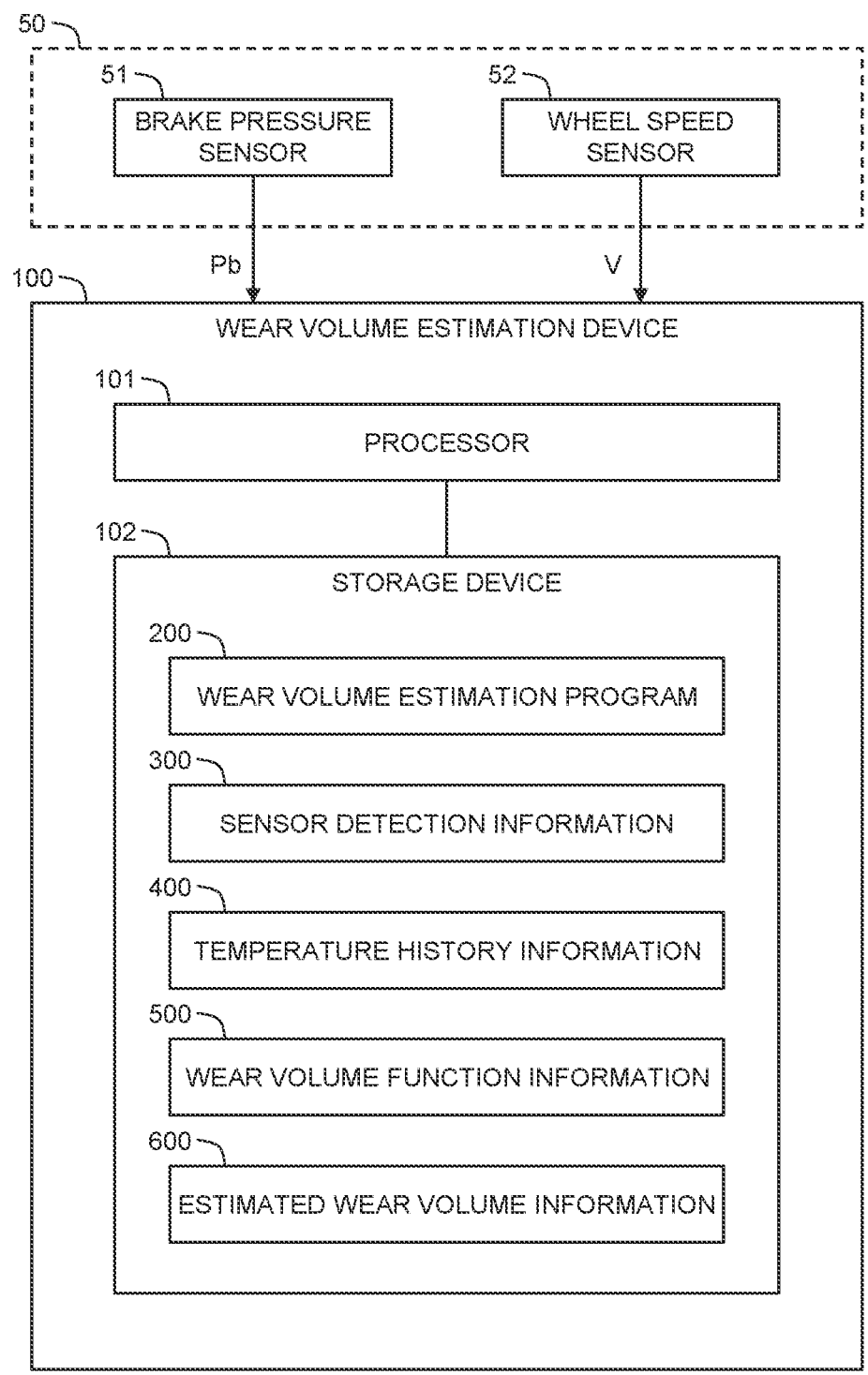
FIG. 5 is a block diagram showing a configuration example of a wear volume estimation device according to an embodiment of the present disclosure.

FIG. 5 is a block diagram showing a configuration example of the wear volume estimation device 100 according to the present embodiment. The wear volume estimation device 100 is a computer that executes a variety of information processing. The wear volume estimation device 100 includes a processor 101 and a storage device 102. The processor 101 executes a variety of information processing. For example, the processor 101 includes a CPU (Central Processing Unit). The storage device 102 stores a variety of information necessary for the processing by the processor 101. Examples of the storage device 102 include a volatile memory, a nonvolatile memory, an HDD (Hard Disk Drive), an SSD (Solid State Drive), and the like.

The wear volume estimation device 100 may be included in an ECU (Electronic Control Unit) that controls the vehicle 1.

2-2. Wear Volume Estimation Program

A wear volume estimation program 200 is a computer program executed by a computer. The functions of the wear volume estimation device 100 (the processor 101) is implemented by the processor 101 executing the wear volume estimation program 200. The wear volume estimation program 200 is stored in the storage device 102. The wear volume estimation program 200 may be recorded on a computer-readable recording medium. The wear volume estimation program 200 may be provided through a network.

2-3. Sensor Detection Information

Sensor detection information 300 is information detected by the sensor 50 installed on the vehicle 1. The sensor 50 includes the brake pressure sensor 51 and a wheel speed sensor 52. The brake pressure sensor 51 detects the brake pressure Pb. The wheel speed sensor 52 detects the vehicle speed V. The sensor detection information 300 includes the vehicle speed V, the brake pressure Pb, and the brake duration tb. The brake duration tb can be acquired from a time during which the brake pressure Pb is generated. The processor 101 acquires the sensor detection information 300 based on the result of detection by the sensor 50. The sensor detection information 300 is stored in the storage device 102.

2-4. Temperature History Information

Temperature history information 400 indicates the temperature history that is a history of the temperature applied to the brake pad 30. In particular, the temperature history information 400 indicates the temperature history of the contact surface 31 of the brake pad 30. The temperature history information 400 may further indicate a profile of the temperature history of the brake pad 30 in the depth direction d.

Figure 6:
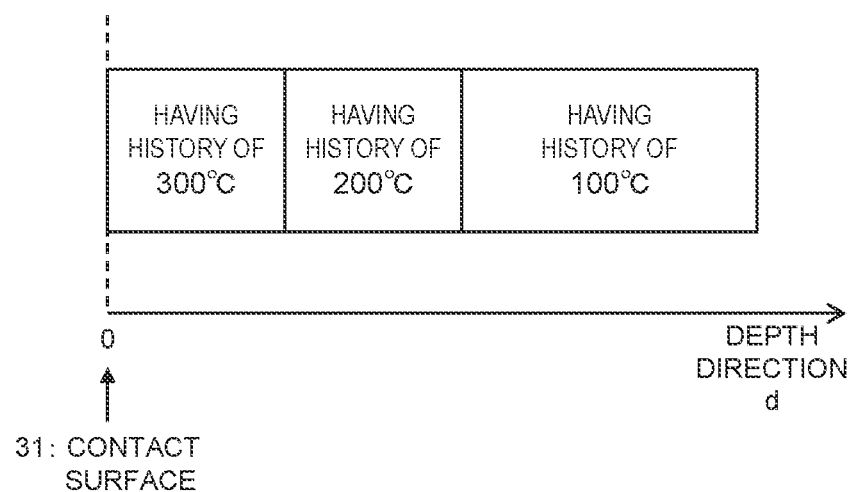
FIG. 6 is a conceptual diagram for explaining a first example of temperature history information according to an embodiment of the present disclosure.

FIG. 6 is a conceptual diagram for explaining a first example of the temperature history information 400. In the first example, the temperature history indicates "whether or not the temperature has a history of becoming equal to or higher than a threshold (e.g., 100° C., 200° C., 300° C.) in the past." In the example shown in FIG. 6, it can be seen that the temperature of the contact surface 31 has a history of becoming higher than 300° C. in the past. Moreover, the temperature history information 400 shown in FIG. 6 indicates the profile of the temperature history of the brake pad 30 in the depth direction d.

Figure 7:
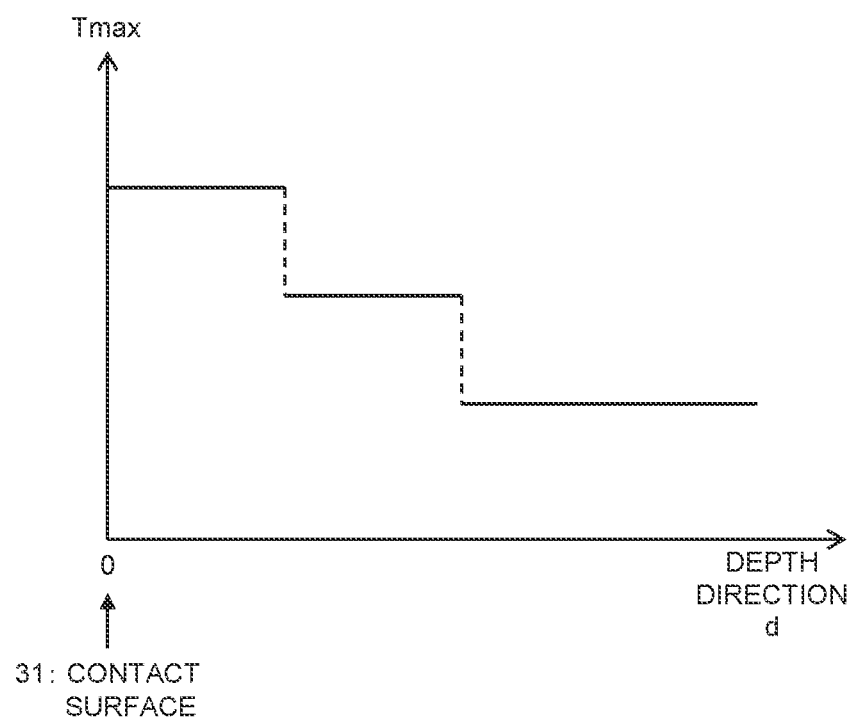
FIG. 7 is a conceptual diagram for explaining a second example of temperature history information according to an embodiment of the present disclosure.

FIG. 7 is a conceptual diagram for explaining a second example of the temperature history information 400. In the second example, the temperature history indicates "a highest value Tmax of the temperature in the past." Moreover, the temperature history information 400 shown in FIG. 7 indicates the profile of the temperature history of the brake pad 30 in the depth direction d.

During the braking of the vehicle 1, the processor 101 generates and updates the temperature history information 400. A method of generating and updating the temperature history information 400 will be described later. The temperature history information 400 is stored in the storage device 102.

2-5. Wear Volume Function Information

Wear volume function information 500 indicates the wear volume function f. The wear volume function f expresses the wear volume W as a function of the vehicle speed V, the brake pressure Pb, and the brake duration tb (see the above Equation (1)). The wear volume W increases as the vehicle speed V becomes higher. The wear volume W increases as the brake pressure Pb becomes higher. The wear volume W increases as the brake duration tb becomes longer.

Moreover, the wear volume W increases as the temperature applied to the contact surface 31 of the brake pad 30 in the past becomes higher. Therefore, according to the present embodiment, different wear volume functions f are prepared for each temperature history of the contact surface 31. That is, the wear volume function information 500 indicates the wear volume function f for each temperature history.

FIG. 8 is a conceptual diagram for explaining a first example of the wear volume function information 500. In the first example, the temperature history indicates "whether or not the temperature of the contact surface 31 has a history of becoming equal to or higher than a threshold (e.g., 100° C., 200° C., 300° C.) in the past." A wear volume function f0 is a default wear volume function f that is used in a case where the temperature of the contact surface 31 does not have a history of becoming equal to or higher than 100° C. in the past. A wear volume function f1 is the wear volume function f that is used in a case where the temperature of the contact surface 31 has a history of becoming equal to or higher than 100° C. and does not have a history of becoming equal to or higher than 200° C. in the past. A wear volume function f2 is the wear volume function f that is used in a case where the temperature of the contact surface 31 has a history of becoming equal to or higher than 200° C. and does not have a history of becoming equal to or higher than 300° C. in the past. A wear volume function f3 is the wear volume function f that is used in a case where the temperature of the contact surface 31 has a history of becoming equal to or higher than 300° C. in the past.

FIG. 9 is a conceptual diagram for explaining a second example of the wear volume function information 500. In the second example, the temperature history indicates "a highest value Tmax of the temperature of the contact surface 31 in the past." A wear volume function f0 is a default wear volume function f that is used in a case where the highest value Tmax is lower than 100° C. A wear volume function f1 is the wear volume function f that is used in a case where the highest value Tmax belongs to a temperature range from 100° C. (inclusive) to 200° C. (exclusive). A wear volume function f2 is the wear volume function f that is used in a case where the highest value Tmax belongs to a temperature range from 200° C. (inclusive) to 300° C. (exclusive). A wear volume function f3 is the wear volume function f that is used in a case where the highest value Tmax belongs to a temperature range from 300° C. (inclusive) to 400° C. (exclusive).

Each wear volume function f (f0 to f3) may be a formula or may be a map. Each wear volume function f is designed in advance based on actual measurements of the vehicle speed V, the brake pressure Pb, the brake duration tb, the temperature history of the contact surface 31, and the wear volume W. It should be noted that on designing the wear volume function f, a temperature of the contact surface 21 of the brake rotor 20 having a higher thermal conductivity is measured instead of the temperature of the contact surface 31 of the brake pad 30. Then, the measured temperature of the contact surface 21 of the brake rotor 20 is regarded as the temperature of the contact surface 31 of the brake pad 30.

The wear volume function information 500 thus generated is stored in advance in the storage device 102.

2-6. Estimated Wear Volume Information

Estimated wear volume information 600 indicates the wear volume W that is estimated (calculated) by the wear volume estimation device 100 (i.e., the processor 101). The estimated wear volume information 600 may indicate the cumulative wear volume Wt which is an integrated value of the wear volume W. A method of estimating the wear volume W will be described later. The estimated wear volume information 600 is stored in the storage device 102.

3. Example of Processing by Wear Volume Estimation Device

Figure 10:
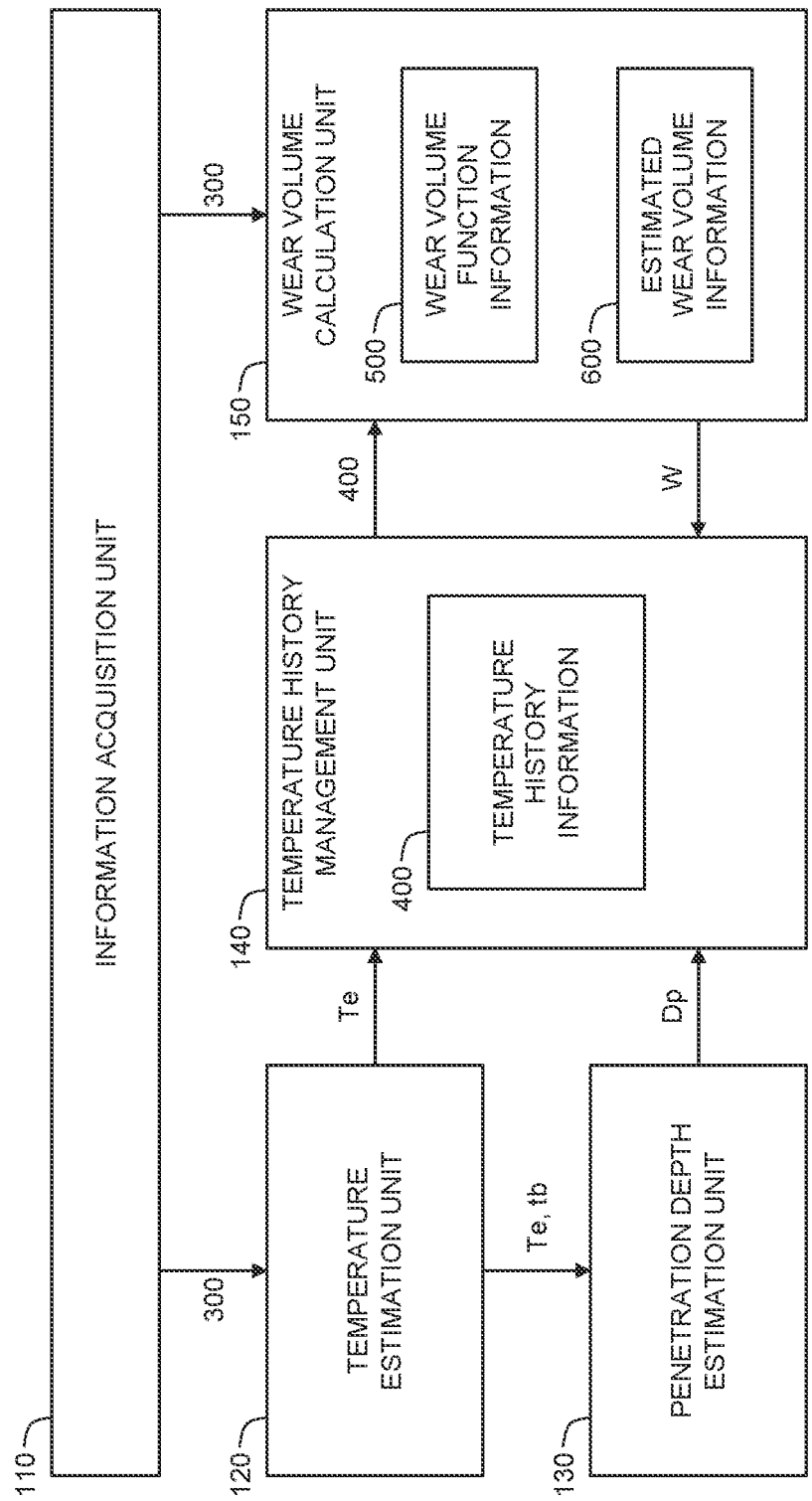
FIG. 10 is a functional block diagram for explaining a processing example by the wear volume estimation device according to an embodiment of the present disclosure.

FIG. 10 is a functional block diagram for explaining a processing example by the wear volume estimation device 100 according to the present embodiment. The wear volume estimation device 100 includes an information acquisition unit 110, a temperature estimation unit 120, a penetration depth estimation unit 130, a temperature history management unit 140, and a wear volume calculation unit 150. These functional blocks are implemented by the processor 101 executing the wear volume estimation program 200.

3-1. Information Acquisition Process

During the braking of the vehicle 1, the information acquisition unit 110 acquires the sensor detection information 300 based on the result of detection by the sensor 50. The sensor detection information 300 includes the vehicle speed V, the brake pressure Pb, and the brake duration tb.

3-2. Temperature Estimation Process

The temperature estimation unit 120 executes a "temperature estimation process" that estimates the temperature of the contact surface 31 of the brake pad 30. The temperature of the contact surface 31 increases as the frictional heat between the brake rotor 20 and the brake pad 30 increases. Therefore, the temperature of the contact surface 31 becomes higher as the vehicle speed V becomes higher. The temperature of the contact surface 31 becomes higher as the brake pressure Pb becomes higher. The temperature of the contact surface 31 becomes higher as the brake duration tb becomes longer. That is, the temperature of the contact surface 31 is expressed by the following Equation (2).

$$Te = g(V, Pb, tb) \qquad \text{Equation (2):}$$

In the Equation (2), Te is the estimated temperature of the contact surface 31. A temperature function g expresses the estimated temperature Te of the contact surface 31 as a function of the vehicle speed V, the brake pressure Pb, and the brake duration tb. The temperature function g may be a formula or may be a map. The temperature function g is designed in advance based on actual measurements or theories.

In the temperature estimation process, the temperature estimation unit 120 receives the sensor detection information 300 from the information acquisition unit 110. Then, the temperature estimation unit 120 calculates the estimated temperature Te of the contact surface 31 based on the sensor detection information 300 (V, Pb, tb) and the temperature function g.

A temperature of the brake rotor 20 may be estimated as the temperature of the contact surface 31 of the brake pad 30. For example, a temperature variation ΔT of the brake rotor 20 is expressed by the following Equation (3).

Equation (3)

$$\Delta T = \Delta Tb - \Delta Tc = \frac{Pb \times r \times A_p \times 2 \times \mu(V) \times V}{R \times M_s \times c} - \frac{h(V) \times A_s \times (T_{pre} - T_{air})}{M_s \times c} \qquad (3)$$

In the Equation (3), ΔTb is an amount of increase in temperature due to braking energy, ΔTc is an amount of decrease in temperature due to cooling, r is an effective braking radius, R is a tire radius, $A_p$ is a piston area, $\mu(V)$ is a friction coefficient between the contact surfaces 21 and 31, $A_s$ is a surface area of a sliding portion of the brake rotor 20, $M_s$ is a weight of the sliding portion of the brake rotor 20, c is a specific heat of the brake rotor 20, h(V) is a thermal conductivity of the brake rotor 20, $T_{pre}$ is a previous temperature of the brake rotor 20, and $T_{air}$ is an air temperature.

The temperature estimation unit 120 calculates the temperature of the brake rotor 20 by calculating the temperature variation ΔT expressed by the Equation (3) at regular intervals (e.g., 0.1 sec). The temperature of the brake rotor 20 is used as the estimated temperature Te of the contact surface 31.

3-3. Penetration Depth Estimation Process

As described in the foregoing FIG. 3, the heat-denatured portion 33 is a portion of the brake pad 30 whose physical property is changed due to the frictional heat between the brake rotor 20 and the brake pad 30. The penetration depth Dp is a depth of the heat-denatured portion 33 from the contact surface 31.

The penetration depth estimation unit 130 executes a "penetration depth estimation process" that estimates the penetration depth Dp. The penetration depth Dp depends on the temperature Te of the contact surface 31 and the brake duration tb. The penetration depth Dp increases as the temperature Te of the contact surface 31 becomes higher. The penetration depth Dp increases as the brake duration tb becomes longer. That is, the penetration depth Dp is expressed by the following Equation (4).

$$Dp = h(Te, tb) \qquad \text{Equation (4):}$$

A penetration depth function h expresses the penetration depth Dp as a function of the estimated temperature Te of the contact surface 31 and the brake duration tb. The penetration depth function h may be a formula or may be a map. The penetration depth function h is designed in advance based on actual measurements or theories.

In the penetration depth estimation process, the penetration depth estimation unit 130 receives information on the estimated temperature Te and the brake duration tb from the temperature estimation unit 120. Then, the penetration depth estimation unit 130 calculates the penetration depth Dp based on the estimated temperature Te, the brake duration tb, and the penetration depth function h.

3-4. Temperature History Management Process

The temperature history management unit 140 manages the temperature history information 400 (see FIGS. 6 and 7).

More specifically, every time the brake operation is performed, the temperature history management unit 140 receives information on the estimated temperature Te of the contact surface 31 from the temperature estimation unit 120 and information on the penetration depth Dp from the penetration depth estimation unit 130. Then, the temperature history management unit 140 updates the temperature history information 400 based on the estimated temperature Te of the contact surface 31 and the penetration depth Dp. Using the penetration depth Dp makes it possible to generate the temperature history information 400 indicating the profile of the temperature history in the depth direction d (see FIGS. 6 and 7).

It should be noted that the temperature history information 400 may indicate only the temperature history of the contact surface 31 and may not include the profile in the depth direction d. In that case, the temperature history management unit 140 updates the temperature history information 400 based on the estimated temperature Te of the contact surface 31.

3-5. Wear Volume Calculation Process

The wear volume calculation unit 150 executes a "wear volume calculation process" that calculates the wear volume W caused by the brake operation this time. The wear volume calculation process is executed in parallel with the temperature estimation process and the penetration depth estimation process described above.

In the wear volume calculation process, the wear volume calculation unit 150 receives the temperature history information 400 from the temperature history management unit 140. The temperature history information 400 here is the one acquired at the time of the previous braking. The wear volume calculation unit 150 variably sets the wear volume function f according to the temperature history of the contact surface 31 indicated by the temperature history information 400.

More specifically, the wear volume function information 500 described above indicates the wear volume function f for each temperature history of the contact surface 31 (see FIGS. 8 and 9). Based on the wear volume function information 500, the wear volume calculation unit 150 selects a wear volume function f according to the temperature history of the contact surface 31. The wear volume function f selected is hereinafter referred to as a "selected wear volume function fs."

The selected wear volume function fs in the case of the wear volume function information 500 shown in FIG. 8 is as follows. In the case where the temperature of the contact surface 31 does not have a history of becoming equal to or higher than 100° C. in the past, the wear volume function f0 is selected as the selected wear volume function fs. In the case where the temperature of the contact surface 31 has a history of becoming equal to or higher than 100° C. and does not have a history of becoming equal to or higher than 200° C. in the past, the wear volume function f1 is selected as the selected wear volume function fs. In the case where the temperature of the contact surface 31 has a history of becoming equal to or higher than 200° C. and does not have a history of becoming equal to or higher than 300° C. in the past, the wear volume function f2 is selected as the selected wear volume function fs. In the case where the temperature of the contact surface 31 has a history of becoming equal to or higher than 300° C. in the past, the wear volume function f3 is selected as the selected wear volume function fs.

The selected wear volume function fs in the case of the wear volume function information 500 shown in FIG. 9 is as follows. In the case where the highest value Tmax of the temperature of the contact surface 31 in the past is lower than 100° C., the wear volume function f0 is selected as the selected wear volume function fs. In the case where the highest value Tmax belongs to a temperature range from 100° C. (inclusive) to 200° C. (exclusive), the wear volume function f1 is selected as the selected wear volume function fs. In the case where the highest value Tmax belongs to a temperature range from 200° C. (inclusive) to 300° C. (exclusive), the wear volume function f2 is selected as the selected wear volume function fs. In the case where the highest value Tmax belongs to a temperature range from 300° C. (inclusive) to 400° C. (exclusive), the wear volume function f3 is selected as the selected wear volume function fs.

Then, the wear volume calculation unit 150 calculates the wear volume W by using the selected wear volume function fs. More specifically, the wear volume calculation unit 150 receives the sensor detection information 300 (V, Pb, tb) from the information acquisition unit 110. Then, the wear volume calculation unit 150 uses the selected wear volume function fs to calculate the wear volume W according to the vehicle speed V, the brake pressure Pb, and the brake duration tb.

The wear volume calculation unit 150 generates the estimated wear volume information 600 indicating the calculated wear volume W. The wear volume calculation unit 150 may calculate the cumulative wear volume Wt by integrating the wear volume W calculated for each brake operation. In this case, the estimated wear volume information 600 indicates the cumulative wear volume Wt as well.

If the cumulative wear volume Wt exceeds a threshold value, the wear volume calculation unit 150 may output an alert through the output device 60 (e.g., a display, a speaker).

Moreover, the wear volume calculation unit 150 provides the temperature history management unit 140 with the information of the calculated wear volume W. The temperature history management unit 140 moves the position of the contact surface 31 in the temperature history information 400 by a depth corresponding to the wear volume W caused this time. That is to say, the temperature history management unit 140 reflects the wear volume W caused this time in the profile of the temperature history of the brake pad 30 in the depth direction d. In other words, the temperature history management unit 140 updates the temperature history information 400 by updating the profile of the temperature history of the brake pad 30 in the depth direction d based on the wear volume W caused this time.

4. Effects

According to the present embodiment, as described above, the temperature of the contact surface 31 of the brake pad 30 that comes in contact with the brake rotor 20 is estimated during the braking of the vehicle 1. Then, the temperature history information 400 indicating the temperature history of the contact surface 31 is updated based on the temperature of the contact surface 31. When calculating the wear volume W of the brake pad 30, the temperature history of the contact surface 31 indicated by the temperature history information 400 is taken into consideration. More specifically, the wear volume function f used for calculating the wear volume W of the brake pad 30 is not fixed but variably set according to the temperature history of the contact surface 31. As a result, the estimation accuracy of the wear volume W is improved.

Moreover, according to the present embodiment, it is possible to estimate the wear volume W with high accuracy by utilizing the existing sensor 50 (i.e., the brake pressure sensor 51 and the wheel speed sensor 52). For example, the temperature of the contact surface 31 of the brake pad 30 is estimated based on the vehicle speed V, the brake pressure Pb, and the brake duration tb. A temperature sensor dedicated to the temperature estimation process is unnecessary. This is useful from a viewpoint of cost reduction.

Furthermore, according to the present embodiment, the cumulative wear volume Wt of the brake pad 30 is automatically calculated. Thus, a failure of the brake pad 30 can be detected automatically regardless of the driver. The present embodiment may be applied to a case where no fixed driver exists (e.g., automated driving vehicle, car sharing).

What is claimed is:

1. A wear volume estimation device that estimates a wear volume of a brake pad of a vehicle,
the wear volume estimation device comprising:
a processor; and
a storage configured to store information on a wear volume function that expresses the wear volume as a function of a vehicle speed, a brake pressure, and a brake duration, wherein
the processor is programmed to execute:
an information acquisition process acquiring information on the vehicle speed, the brake pressure, and the brake duration, during braking of the vehicle;
a wear volume calculation process calculating the wear volume according to the vehicle speed, the brake pressure, and the brake duration by using the wear volume function;
a temperature estimation process estimating a temperature of a contact surface of the brake pad that comes in contact with a brake rotor, based on the vehicle speed, the brake pressure, and the brake duration; and
a temperature history management process updating temperature history information indicating at least a temperature history of the contact surface, based on the temperature of the contact surface, and
in the wear volume calculation process, the processor variably sets the wear volume function according to the temperature history of the contact surface indicated by the temperature history information acquired at a time of previous braking.

2. The wear volume estimation device according to claim 1, wherein
the temperature history of the contact surface indicates whether or not the temperature of the contact surface has a history of becoming equal to or higher than a first threshold in past,
a first wear volume function is the wear volume function that is used in a case where the temperature of the contact surface does not have the history of becoming equal to or higher than the first threshold,
a second wear volume function is the wear volume function that is used in a case where the temperature of the contact surface has the history of becoming equal to or higher than the first threshold,
the storage stores information on the first wear volume function and the second wear volume function,
in the case where the temperature of the contact surface does not have the history of becoming equal to or higher than the first threshold, the processor selects the first wear volume function and calculates the wear volume by using the first wear volume function, and
in the case where the temperature of the contact surface has the history of becoming equal to or higher than the first threshold, the processor selects the second wear volume function and calculates the wear volume by using the second wear volume function.

3. The wear volume estimation device according to claim 1, wherein
the temperature history of the contact surface indicates a highest value of the temperature of the contact surface in past,
a first wear volume function is the wear volume function that is used in a case where the highest value belongs to a first temperature range,
a second wear volume function is the wear volume function that is used in a case where the highest value belongs to a second temperature range,
the storage stores information on the first wear volume function and the second wear volume function,
in the case where the highest value belongs to the first temperature range, the processor selects the first wear volume function and calculates the wear volume by using the first wear volume function, and
in the case where the highest value belongs to the second temperature range, the processor selects the second wear volume function and calculates the wear volume by using the second wear volume function.

4. The wear volume estimation device according to claim 1, wherein
a heat-denatured portion is a portion of the brake pad whose physical property is changed due to frictional heat between the brake rotor and the brake pad,
a penetration depth is a depth of the heat-denatured portion from the contact surface,
the processor is further programmed to estimate the penetration depth based on the temperature of the contact surface and the brake duration,
in the temperature history management process, the processor updates the temperature history information based on the temperature of the contact surface and the penetration depth, and
the temperature history information indicates not only the temperature history of the contact surface but also a profile of a temperature history of the brake pad in a depth direction.

5. The wear volume estimation device according to claim 4, wherein
every time the processor calculates the wear volume, the processor updates the profile of the temperature history in the depth direction based on the calculated wear volume.

6. A wear volume estimation method that estimates a wear volume of a brake pad of a vehicle, wherein a wear volume function expresses the wear volume as a function of a vehicle speed, a brake pressure, and a brake duration,
the wear volume estimation method comprising:
an information acquisition process acquiring information on the vehicle speed, the brake pressure, and the brake duration, during braking of the vehicle;
a wear volume calculation process calculating the wear volume according to the vehicle speed, the brake pressure, and the brake duration by using the wear volume function;
a temperature estimation process estimating a temperature of a contact surface of the brake pad that comes in contact with a brake rotor, based on the vehicle speed, the brake pressure, and the brake duration; and a temperature history management process updating temperature history information indicating at least a temperature history of the contact surface, based on the temperature of the contact surface, wherein the wear volume calculation process includes a process of variably setting the wear volume function according to the temperature history of the contact surface indicated by the temperature history information acquired at a time of previous braking.

7. A wear volume estimation program that estimates a wear volume of a brake pad of a vehicle, wherein a wear volume function expresses the wear volume as a function of a vehicle speed, a brake pressure, and a brake duration, the wear volume estimation program, when executed by a computer, causing the computer to execute:

an information acquisition process acquiring information on the vehicle speed, the brake pressure, and the brake duration, during braking of the vehicle;

a wear volume calculation process calculating the wear volume according to the vehicle speed, the brake pressure, and the brake duration by using the wear volume function;

a temperature estimation process estimating a temperature of a contact surface of the brake pad that comes in contact with a brake rotor, based on the vehicle speed, the brake pressure, and the brake duration; and a temperature history management process updating temperature history information indicating at least a temperature history of the contact surface, based on the temperature of the contact surface, wherein the wear volume calculation process includes a process of variably setting the wear volume function according to the temperature history of the contact surface indicated by the temperature history information acquired at a time of previous braking.

\* \* \* \* \*